No. 747,543. PATENTED DEC. 22, 1903.
E. B. FRENCH.
FEED TROUGH FOR ANIMALS.
APPLICATION FILED MAR. 31, 1903.
NO MODEL.
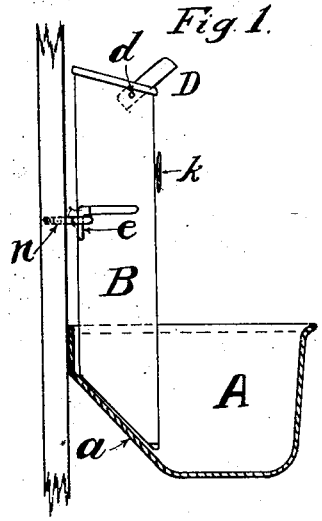
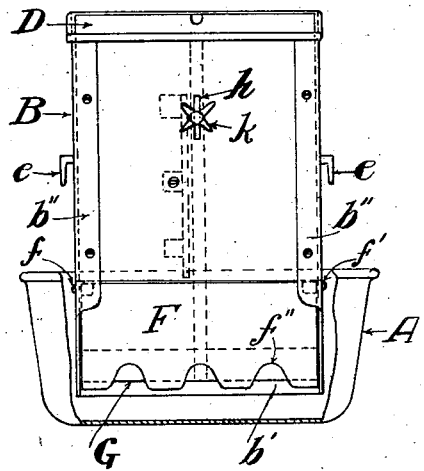
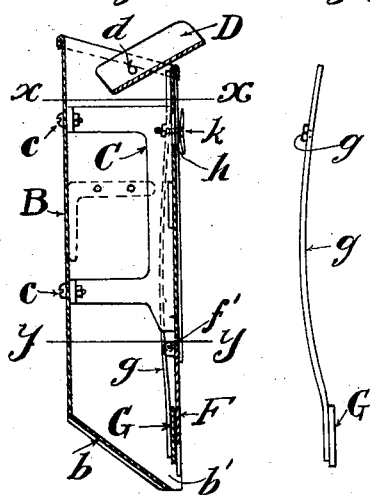
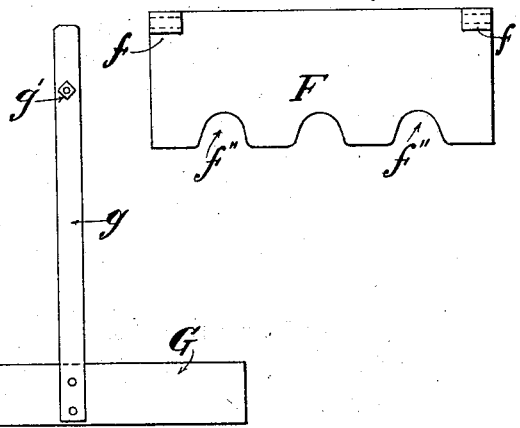
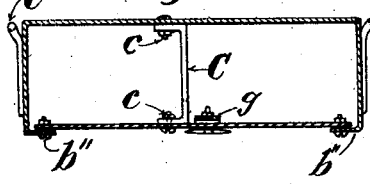
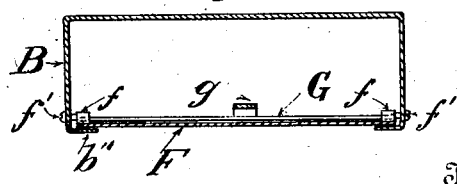
Witnesses
Wm Boyd
Finis D Morris
Inventor
E. B. French.
By E. B. Clark
Attorney No. 747,543.

Patented December 22, 1903.

UNITED STATES PATENT OFFICE.

EARL B. FRENCH, OF WASHINGTON, DISTRICT OF COLUMBIA.

FEED-TROUGH FOR ANIMALS.

SPECIFICATION forming part of Letters Patent No. 747,543, dated December 22, 1903.

Application filed March 31, 1903. Serial No. 150,455. (No model.)

*To all whom it may concern:*

Be it known that I, EARL B. FRENCH, a citizen of the United States, residing at Washington, District of Columbia, have invented certain new and useful Improvements in Feed-Troughs for Animals, of which the following is a specification.

This invention relates to a feed-trough for animals and a connected feed-reservoir having devices for regulating the flow of grain or other feed into the trough.

The object of my invention is to provide simple and effective devices which will supply a limited and regulated quantity of feed to the trough, so as to compel the animal to eat slowly and thoroughly masticate the food and at the same time prevent waste and soiling of the food.

A special object of my invention is to provide a regulated agitating device adapted for controlling the feed or flow of different-sized grain or of ground or crushed grain and prevent clogging of the same in the reservoir.

My improved feed reservoir or hopper may be made detachable from the metallic trough and is adapted to be supported in or above any flat-bottom wooden box to overcome the objection made by some persons to feeding a horse in a metal bowl or trough.

The devices and combinations thereof constituting my invention will be defined in the claims.

I will now describe the details of construction and operation of my improved feed-trough by reference to the accompanying drawings, in which—

Figure 1 represents a side elevation of the reservoir and a transverse section of the trough or bowl. Fig. 2 represents a front elevation with part of the trough broken away. Fig. 3 represents a vertical transverse section of the detached reservoir. Figs. 4, 4ª, and 5 represent detail views. Figs. 6 and 7 represent transverse sections, respectively, on the lines $x\,x$ and $y\,y$ in Fig. 3 of the feed-reservoir.

The trough A is preferably made of sheet or cast metal, of oblong form, with rounded corners and an inclined rear side $a$.

The feed-reservoir B is preferably made of sheet metal, such as galvanized iron, with an inclined bottom $b$ and the front lower opening $b'$. At the front the metal of the sides is overlapped to form the vertical flaps of folds $b''$, which are secured to the front plate and extend down a little below the top edge of the vibrating partition F to limit its forward movement, as indicated in Fig. 2. The cover D is made with end flanges and is pivotally connected by pins $d$ to the upper ends of the sides of the reservoir, so that it may be opened outward to serve as a chute in filling the reservoir with grain. An interior brace C, having side lugs or flanges $c$, is secured centrally by screw-bolts and nuts to the front and back to give the reservoir the necessary strength and rigidity. To the opposite sides of the reservoir are secured the hooks $e$, by means of which the reservoir may be hung in eyes or staples $n$, fixed in a part of the stall or other frame, as shown in Fig. 1, or may be attached to a wagon, caisson, or other place where animals are fed. The reservoir may be suspended so as to rest on the bottom of any trough separately supported in any desired manner. The reservoir and trough will be secured together when desired by flanges and screw-bolts in a well-known manner. Screw-bolts are used in connecting all parts to allow any part to be replaced when desired.

In order that the grain, either in the whole, ground, or crushed condition, may be suitably agitated for causing it to feed down into the trough as required, I provide a short vibrating partition-plate F in the front at the lower end of the reservoir, as shown in Figs. 2 and 5. The plate F is provided at the upper corners of its inner face with the lugs $f$, having holes for the pivotal pins $f'$, which pass through the sides of the reservoir. The lower edge of the partition F is made with openings $f'''$ for the escape of grain into the trough. To the inner face of the vibrating partition is applied a sliding regulating-gate G, having secured to it, centrally, the long curved spring $g$, which extends to the top of the reservoir. The spring $g$ has near its upper end a boss $g'$, having a screw-threaded opening with which is connected the screw $k$, passing through the vertical slot $h$ in the front plate of the reservoir. By adjusting the gate G up or down the height of the openings $f'''$ will be varied for regulating the feed or flow of the grain into the trough. The gate may be closed for cutting off the flow of grain. The pressure of the gate upon the inner face of the vibrating partition F may be increased by more closely drawing the spring $g$ to the front plate by the screw $k$, and by turning outward the screw the pressure on the partition will be lessened, thereby regulating the vibration of said partition. When the screw $k$ is turned outward, the gate G may also be raised or lowered. It is to be understood that the partition F will be pushed inward by the animal feeding at the trough and will be quickly returned outward by the pressure of the spring $g$. This quick outward return of the partition releases the grain after momentary pressure, so that the portion demanded by the animal flows down into the trough. In case ground or crushed grain is being fed and it has a tendency to clog or flow down too slowly the gate G will be raised and its pressure on the vibrating partition adjusted by the screw $k$.

In practice the end of the trough will be presented to the animal so that the reservoir will be at the side of the animal's head, as in that position the animal will by sidewise movements of his head more surely press inward the vibrating partition F, and so secure his feed at successive intervals.

Having described my invention, what I claim, and desire to secure by Letters Patent, is—

1. The combination with a feed-trough, of a reservoir having a vibrating or swinging front partition provided with openings at its lower edge and a separate vertically-adjustable gate, adjacent to said partition, for controlling the flow through said openings of different kinds of feed, substantially as described.

2. In a reservoir for a feed-trough, the combination with a vibrating partition at the lower end of the reservoir, of a spring-pressure device bearing on the inner face of said partition, and having a curved spring-stem, and means for adjusting the pressure of the spring and thereby regulating the vibration of said partition, substantially as described.

3. In a reservoir for a feed-trough, the combination with a vibrating front partition, of a spring-pressed gate bearing on the inner face of said partition and means for adjusting said gate and spring, substantially as described.

4. In a reservoir for a feed-trough, the combination with a fixed front plate having a vertical slot and a vibrating front partition, of a sliding gate applied to the inner face of the partition and having a curved spring-stem provided with a screw-threaded opening and an adjusting-screw passing through said slot and engaging with said opening in the stem, substantially as described.

5. In a reservoir for a feed-trough, the combination with a vibrating front partition having openings in the lower edge, of a spring-pressed sliding gate applied to the inner face of said partition to partly or entirely close the openings and means for raising and lowering the gate and varying the spring-pressure on the partition for controlling the flow of different kinds of feed, or entirely shutting off the flow into the trough, substantially as described.

In testimony whereof I have signed my name to this specification in presence of two witnesses.

EARL B. FRENCH.

Witnesses:
JOS. H. CALLAN,
L. M. GOTWALD.